United States Patent [19]

Knill

[11] 4,319,620
[45] Mar. 16, 1982

[54] PNEUMATIC TIRE HAVING AXIALLY VARYING TREAD COMPOSITION

[75] Inventor: Robert B. Knill, Akron, Ohio

[73] Assignee: The Goodyear Tire & Rubber Company, Akron, Ohio

[21] Appl. No.: 189,392

[22] Filed: Sep. 19, 1980

[51] Int. Cl.³ .......................... B60C 1/00; B60C 11/00
[52] U.S. Cl. ........................... 152/209 R; 152/330 R; 152/357 R; 152/374
[58] Field of Search ............... 152/209 R, 330 R, 374, 152/357 R

[56] References Cited

U.S. PATENT DOCUMENTS

| | | | |
|---|---|---|---|
| 2,224,141 | 12/1940 | Clark | 152/209 R |
| 3,157,218 | 11/1964 | Brown | 152/330 R |
| 3,364,965 | 1/1968 | Oubridge | 152/209 R |
| 3,712,360 | 1/1973 | Torti et al. | 152/209 R |

*Primary Examiner*—Edward C. Kimlin
*Assistant Examiner*—Lois E. Boland
*Attorney, Agent, or Firm*—H. C. Young, Jr.

[57] ABSTRACT

A pneumatic tire having a sulfur-cured rubber tread comprised of an axially central tread portion positioned between two tread portions of about equal size, said tread portions required to be of particular rubber compositions and physical characteristics.

2 Claims, 1 Drawing Figure

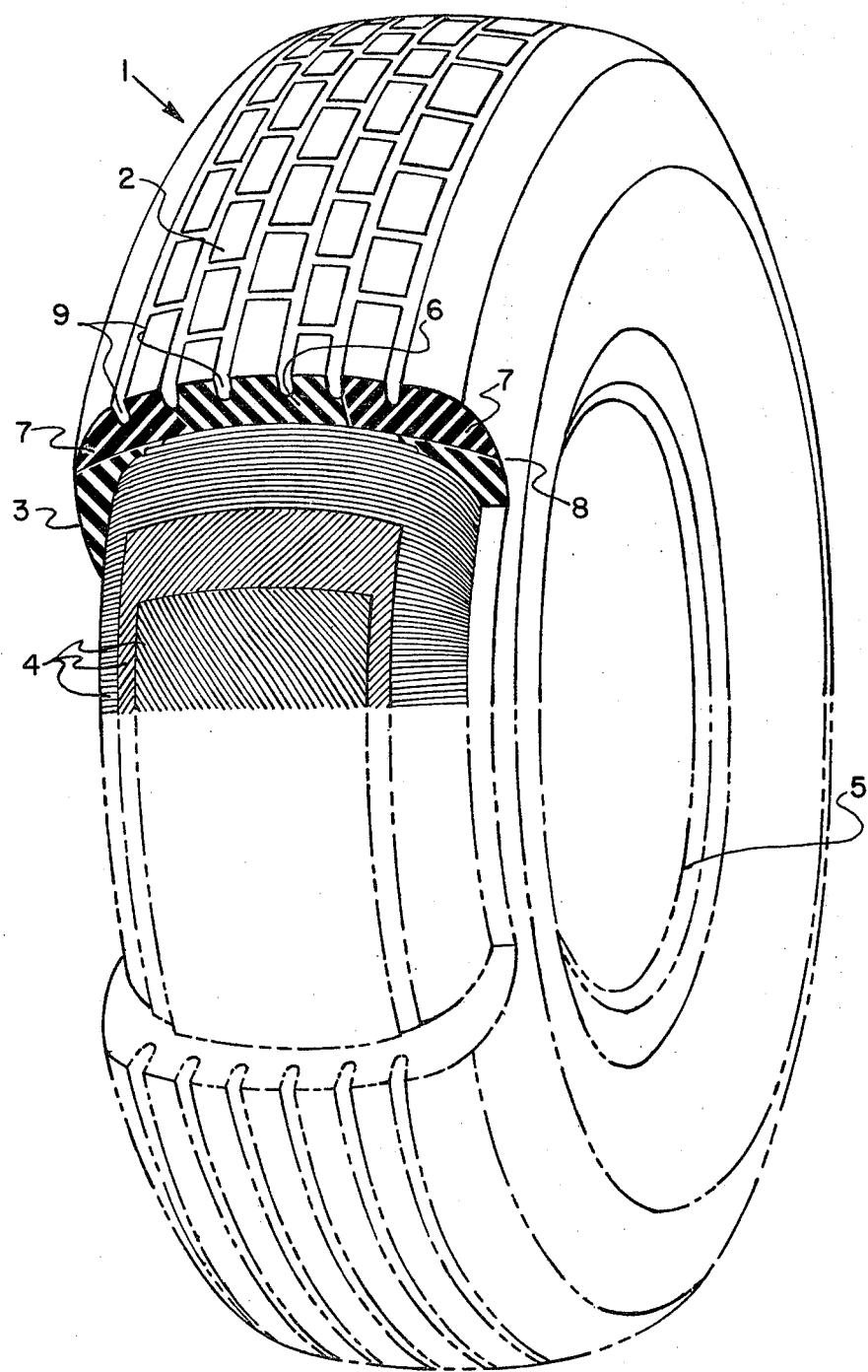

PNEUMATIC TIRE HAVING AXIALLY VARYING TREAD COMPOSITION

FIELD OF INVENTION

This invention relates to pneumatic tires. The invention particularly relates to pneumatic tires having a tread of varying composition.

The invention especially relates to radial pneumatic tires used on passenger vehicles as distinquished from large, oversized or giant pneumatic tires used on large, cargo-carrying vehicles such as large trucks, busses, earthmoving vehicles and the like.

BACKGROUND OF INVENTION

Pneumatic rubber passenger tires conventionally have a resilient, ground-contacting tread of a rubbery, elastomeric composition. The tread rubber is conventionally compounded to provide reasonable passenger comfort, good wear and traction.

However, for automobiles, as compared to larger cargo-carrying vehicles, increasing the energy efficiency of the tire by reducing its rolling resistance has become increasingly important. Such a reduction in rolling resistance for the tire in its inflated state under load would desirably reduce required engine fuel, thereby enhancing an energy savings, preferably without substantially or materially degrading the wear and traction features of the ground-contacting tread of the tire itself.

Tires with treads having portions of differing rubber compositions have been heretofore described for various purposes. For example, a tire with a tread of an outer cap and inner base of somewhat differing rubber compositions has been described (U.S. Pat. No. 3,157,218) as being useful for proving a tread of certain enhanced properties but with a tendency to resist excessive heat buildup. The resistance to excessive heat buildup is understood to enhance overall durability of the tire itself.

Pneumatic tires, particularly of the oversized or giant type for large vehicles as distinguished from passenger vehicle tires having treads with a central region and outer regions of differing rubber composition, have been described. (U.S. Pat. No. 3,364,965). Such tread is designed to have a central region with a synthetic rubber composition having a high coefficient of friction, apparently to enhance vehicular road-handling ability, and outer regions of natural rubber having a lower coefficient of friction.

It was also required that the central and outer regions be of substantially the same hardness. This regional trend design was described as being in contrast to large pneumatic tire treads which theretofore were all of natural rubber because of relatively high tire temperatures being normally attained.

However, a continuing interest remains for pneumatic tires, particularly pneumatic passenger tires, meaning tires for passenger vehicles as distinguished from oversized or giant tires for large vehicles, with relatively low rolling resistance to enhance a vehicular energy or fuel savings without substantially degrading the tread's wear and wet skid resistance.

In accordance with this invention, a pneumatic tire having a circumferential, sulfur cured rubber tread adapted to be ground-contacting, is comprised of an axially central tread portion occupying about 20 to about 60, preferably about 30 to about 55, percent of said tread and positioned between two tread portions of about equal size extending to the shoulder regions of said tire, axially positioned one on each side of said central tread portion, and correspondingly together occupying about 80 to about 40, preferably about 70 to about 45, percent of said tread, where (A) the cured rubber compound of said central portion is composed of about 60 to 100 rubber hydrocarbon (RHC) butadiene/styrene rubber and, correspondingly, about 40 to about 0 RHC cis-1,4-polybutadiene rubber, characterized by having a hot rebound value in the range of about 55 to about 65 and a Shore A hardness in the range of about 58 to about 78 and further characterized, when a part of said tread on said pneumatic tire in its inflated state, by having tread wear, rolling resistance, and wet skid resistance values individually normalized to a value of 100; where (B) the cured rubber of said outer tread portions is composed of about 80 to about 50 RHC natural and/or cis 1,4-polyisoprene rubber and correspondingly, about 20 to about 50 RHC 1,4-polybutadiene rubber, characterized by having a hot rebound value in the range of about 70 to about 85 and a Shore A hardness in the range of about 52 to about 65 and further characterized, when a part of said tread on said pneumatic tire in its inflated state, by having, as compared to the normalized values of said central tread portions, a tread wear value in the range of about 75 to about 110, rolling resistance value in the range of about 120 to about 140 and a wet skid resistance value in the range of about 80 to about 95; and where (C) said overall tread composite on said pneumatic tire in its inflated state is characterized by having, as compared to the normalized values of said normalized central portion, a tread wear value in the range of about 90 to about 110, a rolling resistance value in the range of about 105 to about 135 and a wet skid resistance value in the range of about 90 to about 100.

Resulting Shore A hardness for the rubber composition for the tread's central portion is, on an incidental basis, typically in the range of about 58 to about 78 and in the range of about 52 to about 65 for the outer portions. It is considered that these hardness values are somewhat incidental and of a rather secondary nature to the ranges of rebound values for the respective tread portions for the purposes of this invention.

The hot rebound value (ASTM Test 1054-66) is a measure of a cured rubber's hysteresis or its tendency to generate heat or consume energy under load and working conditions. When the rubber is used as a tread, on an inflated pneumatic tire under load, the hot rebound value can also relate to rolling resistance of the tire itself, a reduction of which can effect an energy savings in the use of a tire on a vehicle such as a passenger automobile.

Thus, with somewhat comparable cured rubber compositions, one with a higher rebound value is indicated to have a lower hysteresis, a reduced heat generation or buildup, a reduced energy consumption and a reduced rolling resistance when used as a tread on an inflated tire under load.

However, such enhanced or reduced tire rolling resistance accomplished by using a tread rubber of higher rebound value can generally be somewhat detrimental to its treadwear and traction, or wet skid resistance.

Therefore, the pneumatic tire with the tread of sectionalized rubber composite positions as required by this invention is considered important for providing a reduced rolling resistance while also providing adequate tread wear and traction, or wet skid resistance.

The wet skid resistance is considered to be a more adequate measure of traction than dry skid resistance of an inflated tire's tread. The values were determined by building comparable tires with treads composed entirely of the rubber compositions to be tested.

The values determined for a tread of the composition of the central portion were simply normalized, or given a rating of 100.

Similarly, the values for treadwear and rolling resistance were also simply given a rating of 100 for comparison purposes to the other tread compositions.

The carcass to which the tread is adhered can be of a generally conventional construction of a generally toroidal shape with cord-reinforced carcass, two spaced, relatively inextensible, beads and sidewall portions extending from said beads axially outward to join the tread at a shoulder region. The rubber of the supporting carcass for the tread can be of various sulfur-cured types such as natural rubber, synthetic cis-1,4-polyisoprene, cis-1,4-polybutadiene, butadiene/styrene copolymers or mixtures thereof.

It is understood that the rubber composition for the tread can be compounded with various conventional compounding ingredients which include carbon black, processing oils, pigments, zinc oxide, stearic acid or a stearate, antioxidants, antiozonants, accelerators, retarders, resins, sulfur, or sulfur-providing compounds.

This invention can be illustrated by the accompanying drawing which is a perspective view of a vehicular rubber tire 1 with a cut-away section showing a cross-section of its tread 2, a portion of its sidewalls 3 and supporting carcass plies 4. The spaced beads, remainder of sidewalls, and other portions of the tire are not shown or pointed out as not considered important in this illustration. The tire is shown as being mounted on a rim 5 and inflated. The axial outer portions 7 of the tread 2 is of compounded rubber which provides a relatively reduced reduction in the mounted and inflated tire's rolling resistance under load. The axial center portion 6 of the tread is considered to be of a more conventional compounded rubber having somewhat conventional rebound, rolling resistance and traction values. Notably, both the central 6 and outer portions 7 of the tread contain grooves 9 and their respective rubber compositions extend from their ground-contacting surface to a position below their grooves.

The thickness of the rubber tread composition on the tire can vary over a reasonably considerable range depending upon a number of factors including the actual size of the tire and its intended use.

The following examples illustrate but do not limit the practice of the present invention.

EXAMPLE

Pneumatic tires of conventional construction (grooved tread, sidewalls, spaced beads, and supporting fabric-reinforced carcass) were built, shaped and cured in a conventional tire mold. The tire was identified as a Custom Polysteel BR78-13 passenger tire which indicated that it was a radial ply polyester cord-reinforced carcass with circumferential steel cord belts), similar to the drawing in this specification, except that the drawing does not illustrate the belts and shows only simple grooves for the tread.

The tread rubber compound of the conventional control tire (A) was composed of 90 rubber hydrocarbon (RHC) butadiene/styrene rubber and 10 RHC polybutadiene rubber and contained about 80 phr carbon black and about 48 phr aromatic-type rubber processing oil.

It should be understood that in relating to or describing rubber compounds, reference to elements of its composition is made in terms of or is based on (A) 100 parts by weight rubber (phr) and/or on rubber hydrocarbon (RHC). For example, a rubber composition containing the standard referenced 100 parts by weight rubber, composed of 60 weight percent butadiene/styrene rubber and, correspondingly, 40 weight percent polybutadiene, together with 50 parts by weight carbon black and 30 parts processing oil, would be described as follows:

A rubber composition composed of 60 RHC butadiene/styrene rubber, 40 RHC polybutadiene and containing 50 phr carbon black and 30 phr processing oil.

A similar tire (B), except for its tread composition was prepared. Its tread had been formed by coextruding a rubber composition so that the resulting tread had a center portion occupying about 40 percent of the tread and two outer portions of equal sizes on either side of the center portion, similar to the drawing in this specification. The center portion was of the composition of the tread of the control tire (A). The rubber composition of the outer portions of the tread of the experimental tire (B) was composed of 50 RHC natural rubber and 50 RHC polybutadiene rubber and contained 50 phr carbon black and 17.5 phr aromatic-type rubber processing oil.

The tires (A and B) were mounted on rims, inflated and submitted to testing. The test values for the control were normalized to a value of 100 for comparison purposes. The tires with the experimental tread was tested and its test values compared to the values of the control tire and reported relative to the normalized values of 100 for the control as shown in Table I.

| TEST | TEST RESULTS | |
|---|---|---|
| | CONTROL (A) | EXPERIMENTAL (B) |
| Rolling resistance | 100 | 107 (Better) |
| Energy Efficiency | 100 | 102 (Better) |
| Treadwear | 100 | 105 (Better) |
| Traction | | |
| Wet | 100 | 93 (Decrease) |
| Dry | 100 | 98 (Decrease) |

Thus the tire with the experimental tread of this invention demonstrated improved rolling resistance (less resistance to rolling), energy efficiency (less fuel required to propel a vehicle), treadwear (less treadwear, or greater distance to the same degree of wear on the tread) with some degree of loss in traction.

The rolling resistance was determined by mounting the tire and allowing it to be turned by a 67 inch diameter dynamometer under about 80 percent of its rated load at a rate equivalent to a vehicular speed of 50 mph and the drag force measured. The test is believed to be somewhat standard.

it is to be appreciated that the value for rolling resistance, as compared to a norm of 100, is presented herein as greater than 100 for an increase in its comparative value which translates to a reduction in actual resistance to rolling. Thus a value of 107 compared to a norm of 100 is an increase in rolling resistance value indicating a relative decrease in resistance to rolling.

The treadwear was compared by actually mounting the tires on a vehicle and driving it under controlled conditions.

The energy efficiency was compared by actually measuring quantity of fuel used in propelling an automobile using the tire.

It is to be appreciated that an increase in energy efficiency value as compared to a norm of 100 is presented herein as a relative decrease in actual energy or fuel required to propel the vehicle or an increase in miles per gallon of fuel.

The skid resistance was a standard test in which the tires (A and B) are mounted on opposite sides of a weighted, drawn trailer at various speeds and brakes of the trailer applied and skid force (peak and slide) measured.

While certain representative embodiments and details have been shown for the purpose of illustrating the invention it will be apparent to those skilled in this art that various changes and modifications may be made therein without departing from the spirit or scope of the invention.

I claim:

1. A pneumatic tire having a circumferential, sulfur-cured rubber tread adapted to be ground-contacting, comprised of an axially central tread portion occupying about 30 to about 55 percent of said tread and positioned between two tread portions of about equal size extending to the shoulder regions of said tire, axially positioned one on each side of said central tread portion, and correspondingly together occupying about 70 to about 45 percent of said tread, where (A) the cured rubber compound of said central portion is composed of about 60 to about 100 rubber hydrocarbon (RHC) butadiene/styrene rubber and, correspondingly, about 40 to about 0 RHC cis-1,4-polybutadiene rubber, characterized by having a hot rebound value in the range of about 55 to about 65 and a Shore A hardness in the range of about 58 to about 78 and further characterized, when a part of said tread on said pneumatic tire in its inflated state, by having tread wear, rolling resistance, and wet skid resistance values individually normalized to a value of 100; where (B) the cured rubber of said outer tread portions is composed of about 80 to 50 RHC natural and/or cis-1,4-polyisoprene rubber and correspondingly, about 20 to about 50 RHC 1,4-polybutadiene rubber, characterized by having a hot rebound value in the range of about 70 to about 85 and a Shore A hardness in the range of about 52 to about 65 and further characterized, when a part of said tread on said pneumatic tire in its inflated state, by having, as compared to the normalized values of said central tread portions, a tread wear value in the range of about 75 to about 110, rolling resistance value in the range of about 120 to about 140 and a wet skid resistance value in the range of about 80 to about 95; and where (C) said overall tread composite on said pneumatic tire in its inflated state is characterized by having, as compared to the normalized values of said normalized central portion, a tread wear value in the range of about 90 to about 110, a rolling resistance value in the range of about 105 to about 135 and a wet skid resistance value in the range of about 90 to about 100; and where the rubber of the supporting carcass is at least one of a sulfur-cured rubber selected from natural rubber, synthetic cis-1,4-polyisoprene, cis-1,4-polybutadiene and butadiene/styrene copolymers.

2. The pneumatic tire of claim 1, as a pneumatic rubber tire of a generally toroidal shape with cord-reinforced carcass, two spaced, relatively inextensible beads, and sidewall portions extending from said beads radially outward to join the tread at the shoulder region; where said central and outer tread portions extend from the outer ground-contacting surface to a position below their grooves in the tread.

* * * * *